(12) United States Patent
Ohayon

(10) Patent No.: US 12,156,089 B1
(45) Date of Patent: Nov. 26, 2024

(54) SYSTEM, METHOD, AND COMPUTER PROGRAM FOR USING MACHINE LEARNING TO MAKE INTELLIGENT VENDOR RECOMMENDATIONS

(71) Applicant: Amdocs Development Limited, Limassol (CY)

(72) Inventor: Jean-Marc Eric Ohayon, Givat Shmuel (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 943 days.

(21) Appl. No.: 17/165,783

(22) Filed: Feb. 2, 2021

(51) Int. Cl.
| | |
|---|---|
| *H04W 4/02* | (2018.01) |
| *G06N 3/08* | (2023.01) |
| *G06N 7/01* | (2023.01) |
| *G06N 20/00* | (2019.01) |
| *G06Q 10/0637* | (2023.01) |
| *G06Q 30/016* | (2023.01) |

(52) U.S. Cl.
CPC ............... *H04W 4/02* (2013.01); *G06N 3/08* (2013.01); *G06N 7/01* (2023.01); *G06N 20/00* (2019.01); *G06Q 10/06375* (2013.01); *G06Q 30/016* (2013.01)

(58) Field of Classification Search
CPC .. H04W 4/02; G06N 3/08; G06N 7/01; G06N 20/00; G06Q 10/06375; G06Q 30/016
See application file for complete search history.

(56) References Cited

U.S. PATENT DOCUMENTS

| | | | |
|---|---|---|---|
| 9,848,085 B2 | 12/2017 | Conway et al. | |
| 10,373,089 B2 | 8/2019 | Zhang et al. | |
| 10,506,237 B1* | 12/2019 | Liu | H04L 65/762 |
| 10,607,143 B2* | 3/2020 | Vijil | G06N 20/00 |
| 2009/0256947 A1* | 10/2009 | Ciurea | H04N 23/633 348/333.12 |
| 2014/0104453 A1* | 4/2014 | Fujinawa | H04N 23/611 348/222.1 |

(Continued)

FOREIGN PATENT DOCUMENTS

| | | | | |
|---|---|---|---|---|
| AU | 2004311841 A1 * | 8/2006 | ........... | G11B 27/034 |
| CN | 109345263 A | 2/2019 | | |
| JP | 2003069638 A | 3/2003 | | |

OTHER PUBLICATIONS

Ohayon, U.S. Appl. No. 17/165,741, filed Feb. 2, 2021.

(Continued)

*Primary Examiner* — Asghar H Bilgrami
(74) *Attorney, Agent, or Firm* — Zilka-Kotab, P.C.

(57) ABSTRACT

As described herein, a system, method, and computer program are provided for using machine learning to make intelligent vendor recommendations. In use, a service to be provided at a specified location is identified. A plurality of vendors available to provide the service at the specified location are identified. A plurality of machine learning models are used to make a plurality of predictions for each vendor of the plurality of vendors, the plurality of predictions being associated with the vendor providing the service at the specified location. A vendor of the plurality of vendors is selected for provisioning the service at the specified location, based on the plurality of predictions made for each vendor of the plurality of vendors.

17 Claims, 5 Drawing Sheets

(56) References Cited

U.S. PATENT DOCUMENTS

| | | | |
|---|---|---|---|
| 2014/0223462 A1* | 8/2014 | Aimone | A61B 5/369 |
| | | | 725/10 |
| 2015/0138427 A1* | 5/2015 | Kennedy | H04N 23/631 |
| | | | 348/345 |
| 2015/0297949 A1* | 10/2015 | Aman | G06T 7/246 |
| | | | 348/157 |
| 2016/0292610 A1 | 10/2016 | Sapre et al. | |
| 2017/0140580 A1 | 5/2017 | Marr | |
| 2020/0118071 A1 | 4/2020 | Venkatesan et al. | |
| 2020/0184407 A1 | 6/2020 | Mappus et al. | |
| 2020/0210965 A1 | 7/2020 | Garber et al. | |
| 2020/0219163 A1* | 7/2020 | Kumar | G06Q 30/0627 |
| 2020/0401887 A1* | 12/2020 | Kusnoto | G06N 3/08 |
| 2021/0050117 A1* | 2/2021 | Ogallo | G16H 70/20 |
| 2021/0142249 A1* | 5/2021 | Ellsworth | G06N 20/10 |
| 2021/0266269 A1* | 8/2021 | McBride | G06N 3/04 |
| 2022/0237728 A1* | 7/2022 | Medisetty | G06Q 10/20 |

OTHER PUBLICATIONS

Final Office Action from U.S. Appl. No. 17/165,741, dated Sep. 27, 2022.
Non-Final Office Action from U.S. Appl. No. 17/165,741, dated Feb. 24, 2022.
Advisory Action from U.S. Appl. No. 17/165,741, dated Dec. 2, 2022.
Non-Final Office Action from U.S. Appl. No. 17/165,741, dated Mar. 3, 2023.

* cited by examiner

SYSTEM, METHOD, AND COMPUTER PROGRAM FOR USING MACHINE LEARNING TO MAKE INTELLIGENT VENDOR RECOMMENDATIONS

FIELD OF THE INVENTION

The present invention relates to techniques for selecting vendors during a business-to-business telecommunications sales process.

BACKGROUND

During a business-to-business (B2B) telecommunications sales process, when building a proposal with one or multiple sites, sales people need to choose a vendor that can provide a service for each site location. The vendor can be the telecommunications provider itself or another telecommunications provider. This process is critical as it impacts the proposal cost, price, profitability, delivery and customer satisfaction.

Current solutions provide only available vendors for a specific location. Unfortunately, these solutions select a vendor only according to the offer cost for a specific location, and thus do not take into consideration additional factors that may have an impact on the telecommunications sales process. For example, current solutions do not take into consideration expected delivery time (for providing the service) by a particular vendor, likelihood of meeting the expected delivery time, history of customer retention by particular vendors, history of customer satisfaction for particular vendors, etc., all of which will likely impact directly the proposal profitability/cost and customer satisfaction.

There is thus a need for addressing these and/or other issues associated with the prior art.

SUMMARY

As described herein, a system, method, and computer program are provided for using machine learning to make intelligent vendor recommendations. In use, a service to be provided at a specified location is identified. A plurality of vendors available to provide the service at the specified location are identified. A plurality of machine learning models are used to make a plurality of predictions for each vendor of the plurality of vendors, the plurality of predictions being associated with the vendor providing the service at the specified location. A vendor of the plurality of vendors is selected for provisioning the service at the specified location, based on the plurality of predictions made for each vendor of the plurality of vendors.

DETAILED DESCRIPTION

Figure 1:
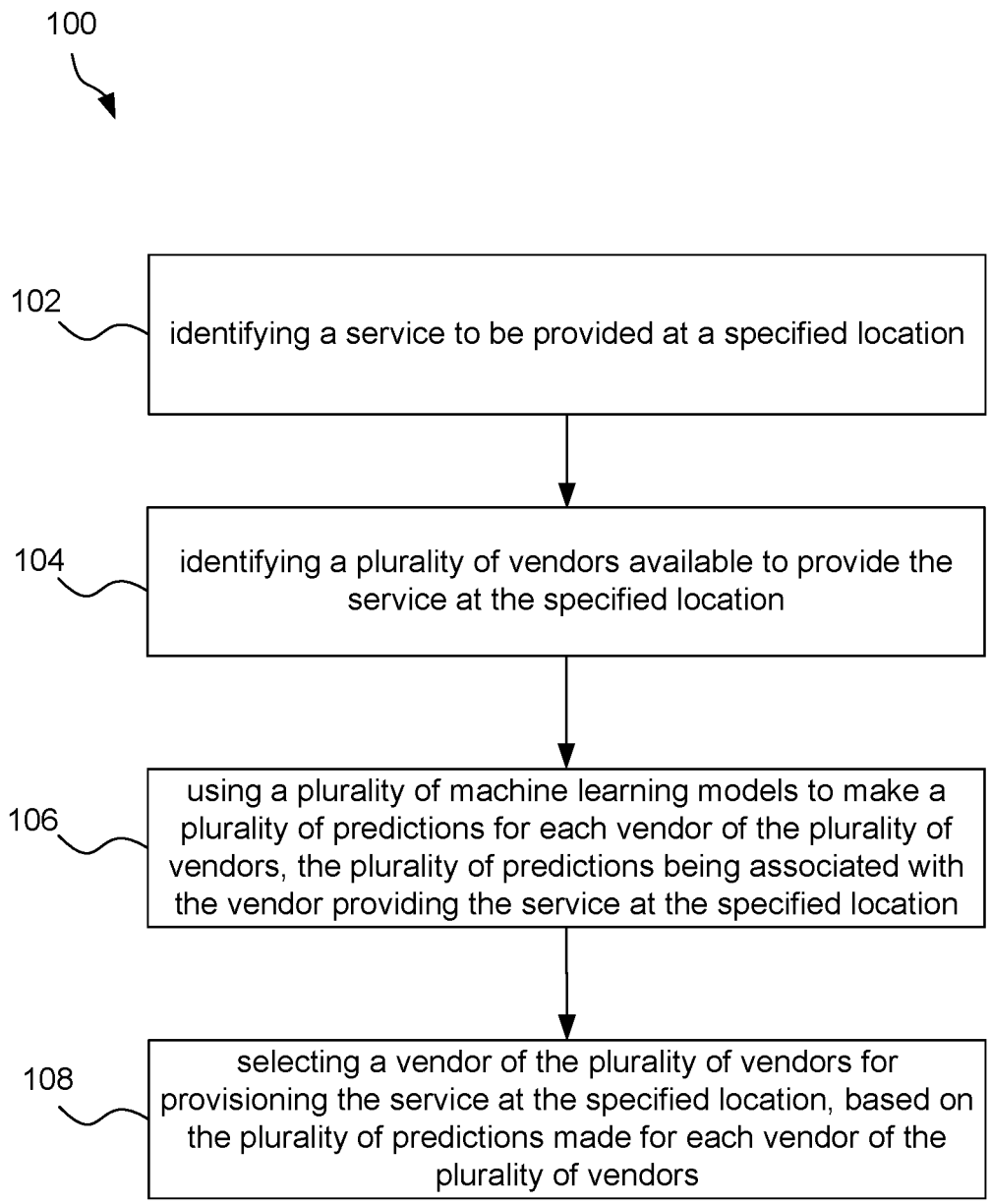
FIG. 1 illustrates a method for using machine learning to make intelligent vendor recommendations, in accordance with one embodiment.

FIG. 1 illustrates a method 100 for using machine learning to make intelligent vendor recommendations, in accordance with one embodiment. The method 100 may be performed by any computer system, such as those described below with reference to FIGS. 4 and/or 5. In one embodiment, the method 100 may be performed by system of a vendor capable of providing one or more services to customers.

In operation 102, a service to be provided at a specified location is identified. In one embodiment, the service may be a telecommunications service, such as a phone service, Internet service, etc. Of course, however, the service may be any type of service capable of being provided (e.g. enabled, configured, deployed, etc.) at a specified location.

The specified location may be any location specified (e.g. defined, indicated, etc.) by one or more characteristics. For example, the specified location may be an address, a building, or any other location at which the service can be provided. In one embodiment, the specified location may be a site of a customer requesting the service. As an option, the service and the specified location may be identified from a request received from the customer to provide the service at the specified location.

In operation 104, a plurality of vendors available to provide the service at the specified location are identified. The vendors may be any business entities capable of providing the service at the specified location. For example, where the service is a telecommunications service, the vendors may be different telecommunications service providers.

The vendors may be identified as being available in any desired manner. Just by way of example, a catalog may store an indication of vendors and services provided by those vendors (e.g. at certain locations or regions). In this case, the vendors may be identified from information in the catalog indicating that the vendors are capable of providing the service at the specified location. As another example, the vendors may be identified as being available based on inquiries made to the vendors regarding provisioning the service at the specified location. In this case, the vendors may respond that they are available to provide the at the specified location (e.g. for a specified cost).

In operation 106, a plurality of machine learning models are used to make a plurality of predictions for each vendor of the plurality of vendors, the plurality of predictions being associated with the vendor providing the service at the specified location. In one embodiment, the plurality of machine learning models may include a machine learning model that predicts a time of delivery of the service at the specified location by the vendor. The time of delivery may refer to a time period for the service to be provisioned by the vendor at the specified location. For example, the time of delivery may refer to a time period starting with an order (e.g. from the customer) for the service and ending with a completion of the provisioning of the service at the specified location.

In another embodiment, the plurality of machine learning models may include a machine learning model that predicts a probability of the vendor meeting an expected time of delivery of the service at the specified location. The expected time of delivery may be the time of delivery predicted for the vendor, as described above.

In yet another embodiment, the plurality of machine learning models may include a machine learning model that predicts a degree of customer satisfaction resulting from the vendor providing the service at the specified location. The degree of customer satisfaction may be measured in terms of a likelihood of the customer to issue a complaint responsive to provisioning of the service by the vendor.

In still yet another embodiment, the plurality of machine learning models may include a machine learning model that predicts a probability of customer retention resulting from the vendor providing the service at the specified location. Customer retention may refer to the customer continuing with the service once provisioned at the specified location by the vendor, for example.

As an option, each machine learning model of the plurality of machine learning models may be any model (e.g. regression model, classification model) trained by a machine learning algorithm to make a prediction associated with a particular vendor providing the service at the specified location. In one embodiment, each machine learning model may be generated using a corresponding supervised machine learning process. For example, the supervised machine learning process may be performed on a plurality of historical records of a plurality of previously provisioned services. Each historical record may correspond to a previously provisioned service and may indicate various information associated with the previously provisioned service. The information may include a vendor of the previously provisioned service, a service of the previously provisioned service, characteristics of a location of the previously provisioned service, a time of delivery of the previously provisioned service, any delays in the delivery of the previously provisioned service, any complaints associated with the previously provisioned service, a severity of any complaints associated with the previously provisioned service, a cancellation or disconnection of the service after being provisioned, etc. In this way, each machine learning process may learn in a supervised manner from historical records.

In operation 108, a vendor of the plurality of vendors is selected for provisioning the service at the specified location, based on the plurality of predictions made for each vendor of the plurality of vendors. Any rules may be applied to the predictions output by the machine learning models for each vendor, optionally in combination with other information, in order to select the vendor for provisioning the service at the specified location. The rules may aim to select a vendor with an optimal combination of predictions. As an option, the vendor may be further selected based on a cost of an offer of the vendor to provision the service at the specified location.

To this end, when multiple vendors are available to provision a service at a specified location, machine learning may be used to make predictions associated with each vendor, which in turn may be used to select one of the available vendors for provisioning the service. In one embodiment, a proposal to provide the service at the specified location may be generated, based on the selected vendor. The proposal may then be provided to the customer associated with the specified location (e.g. that requested the service). Further still, an order may be received from the customer for the provisioning of the service at the specified location, based on the proposal.

It should be noted that while the method 100 is described with reference to a single service at a single specified location, other embodiments are contemplated in which the method 100 is similarly applied with respect to multiple services and/or multiple specified locations. For example, the customer may request multiple different services at the specified location, or may request a same service at multiple different locations, or may request multiple different services at multiple different locations. This embodiment will be described below in more detail with reference to FIG. 3.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
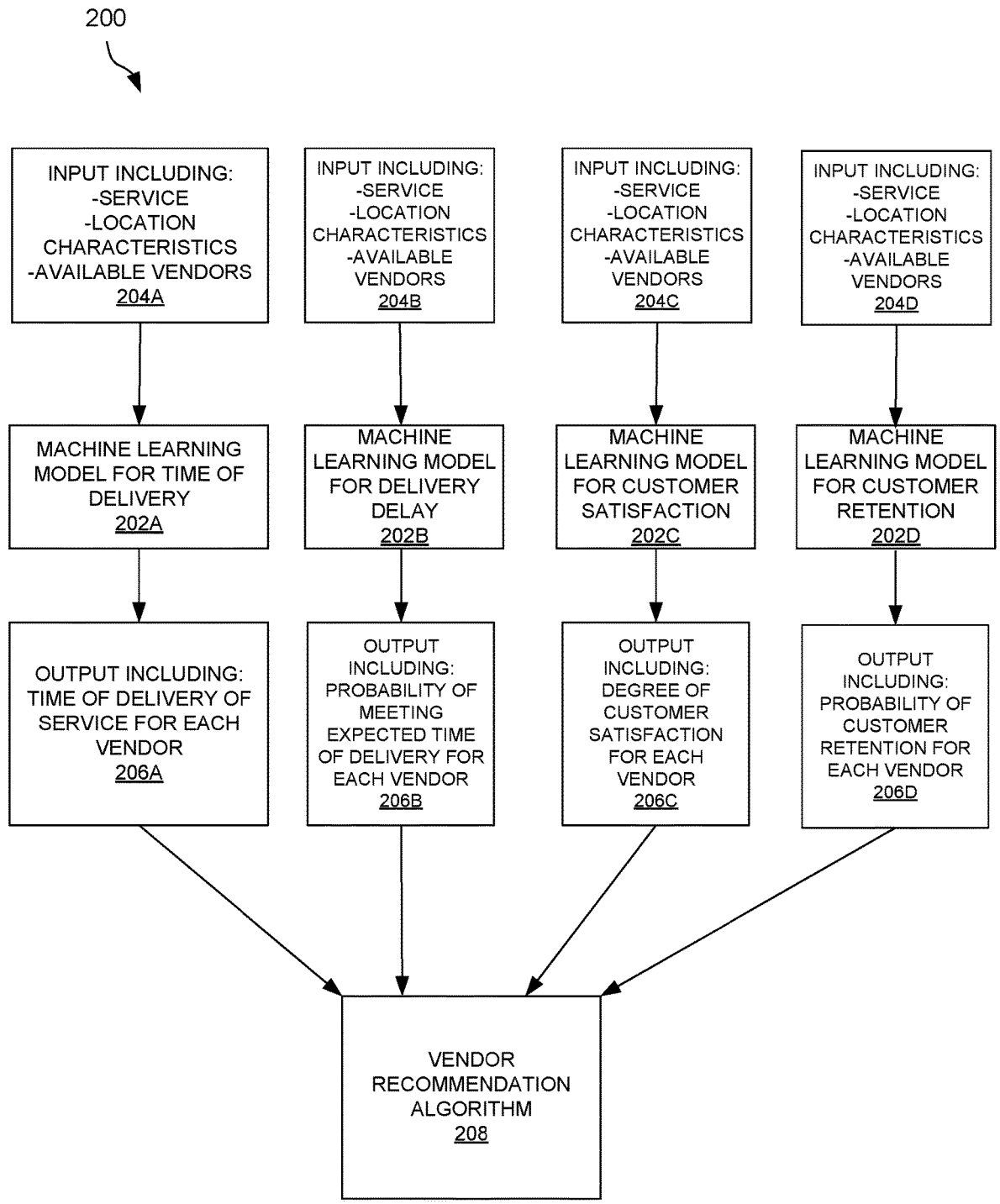
FIG. 2 illustrates a block diagram of an input and output flow for using a plurality of machine learning models to select a vendor to provision a service at a specified location, in accordance with one embodiment.

FIG. 2 illustrates a block diagram of an input and output flow for using a plurality of machine learning models to select a vendor to provision a service at a specified location, in accordance with one embodiment. As an option, the input and output flow may be implemented in the context of the details of the previous figure and/or any subsequent figure(s). Of course, however, the input and output flow may be implemented in the context of any desired environment. Further, the aforementioned definitions may equally apply to the description below.

As shown, a plurality of machine learning (e.g. regression, classification) models 202A-D process corresponding input 204A-D to provide a corresponding prediction as output 206A-D. Each of the machine learning models 202A-D may be trained by a machine learning algorithm to make a corresponding prediction. In one embodiment, the machine learning models 202A-D may be generated using a supervised machine learning process which takes as input a training data set including a plurality of historical records of a plurality of services previously provisioned by various vendors.

Training data set for machine learning models 202A and 202B may include a data history of previous orders/installations. Training data set for machine learning model 202C may include a data history of previous service disconnection and technology/bandwidth/vendor changes after installation. Training data set for machine learning model 202D may include a data history of a number of complaints and/or severity of complaints for each vendor.

As shown, each machine learning model 202A-D receives as input 204A-D an indication of the service, characteristics of the service location (e.g. region, type of building, bandwidth available at the location, etc.), and vendors available to provide the service at the location. Each of the machine learning models 202A-D processes the corresponding input 204A-D to generate output 206A-D that is a prediction, for each vendor.

Machine learning model 202A is configured to provide output 206A which is a prediction of a time of delivery of the service by the vendor at the specified location. One example of machine learning model 202A is described in U.S. application Ser. No. 17/165,741, filed on Feb. 2, 2021 and entitled "SYSTEM, METHOD, AND COMPUTER PROGRAM FOR USING MACHINE LEARNING TO PREDICT VENDOR DELIVERY TIME," the entire contents of which are incorporated by reference in their entirety.

In one embodiment, machine learning model 202A will be trained with the data history of all the previous services that were ordered in the past for all customers, from all the vendors, and for all the site locations.

Examples of features for the machine learning model include:
A) Information about the customer that the service is provided for—such as market segment (e.g. small- and medium-sized businesses [SMB], Mid-Market, Enterprise), size, number of sites, etc.

B) Information about the quote/proposal where the service is part of—such as number of sites in the proposal, number of services in the proposal, types of services, price and cost of the services, agreement duration, etc.

C) Order information for the specific service-such as order date, delivery date, service type, service name/ID, service cost, service price, discount, etc.

D) Characteristics of the service, such as product characteristics depending on the product type. For example if it's an internet service: technology such as Fiber, Cable, Asymmetric digital subscriber line (ADSL), Satellite, —Internet bandwidth speed like 500 Mbps, 1 Gbps, etc.

E) Information about the Vendor that delivered the service-vendor name/ID, vendor size, vendor type, etc.

F) Information about the location where the service was delivered-city, region, address, State, etc.

After machine learning model 202A is trained, for each available vendor for a specific location where a specific service should be provided, the system will send the above information for a specific service for a specific location to the model 202A and as an output 206A will get the delivery time prediction for a specific service for a specific location for this specific vendor. The machine learning model 202A that will be used will be a supervised machine learning model (classification or regression).

Machine learning model 202B is configured to provide output 206B which is a prediction of a probability of the vendor meeting an expected time of delivery of the service at the specified location. In other words, the output 206B may be a prediction of the vendor experiencing any delays in the time of delivery of the service at the specified location. The expected time of delivery may be the time of delivery predicted for the vendor, as described above.

Machine learning model 202B will be trained with the same data as mentioned above with additional data about the committed/expected delivery time from the vendor, real/final delivery time and delays in days. After the machine learning model 202B is trained, for each available vendor for a specific location where a specific service should be provided, the system will send the above information to the model 202B and as an output 206B will get the probability to meet the vendor committed delivery time for a specific service for a specific location for this specific vendor. The machine learning model 202B that will be used will be a supervised machine learning model (classification or regression).

Machine learning model 202C is configured to provide output 206C which is a prediction of a degree of customer satisfaction resulting from the vendor providing the service at the specified location. The degree of customer satisfaction may be measured in terms of a likelihood of the customer to issue a complaint responsive to provisioning of the service by the vendor.

Machine learning model 202D is configured to provide output 206D which is a prediction of a probability of customer retention resulting from the vendor providing the service at the specified location. Customer retention may refer to the customer continuing with the service once provisioned at the specified location by the vendor, for example.

The output 206A-D of the machine learning models 202A-D is processed, in combination, by a vendor recommendation algorithm 208 to select a vendor for provisioning the service at the specified location. The vendor recommendation algorithm 208 may include predefined rules according to which one of the available vendors is selected for provisioning the service at the specified location. The rules may be configured to select a vendor with an optimal combination of the predictions.

In one embodiment, the vendor recommendation algorithm 208 will do the following:

For each available vendor for a specific service for a specific location:

1) Invoke the below machine learning models and get:

Vendor delivery time machine learning model 202A to get prediction of vendor delivery time for the specific service for this specific location for this specific vendor.

Prediction to meet delivery time machine learning model 202B to get the probability in percentage to meet the committed delivery for a specific vendor for the specific service for the specific location.

Customer retention machine learning model 202D to get the probability of customer retention for this specific service for this specific location for this specific vendor.

Prediction of customer satisfaction machine learning model 202C to get the prediction degree of satisfaction for this specific service for this specific location for this specific vendor.

2) For each prediction result of 202A-D, get a score based on predefined criteria for example for 202A: Vendor delivery time less than 7 days is 100, between 7 and 14 days is 75, between 14 days and 30 days is 50, between 30 days and 60 days is 25, more than 60 days is 0.

3) Get the average score of the outputs of 202A-D.

4) Compare the average score of each available vendor and suggest the vendor with the best average score with the score details for the outputs of 202A-D.

Figure 3:
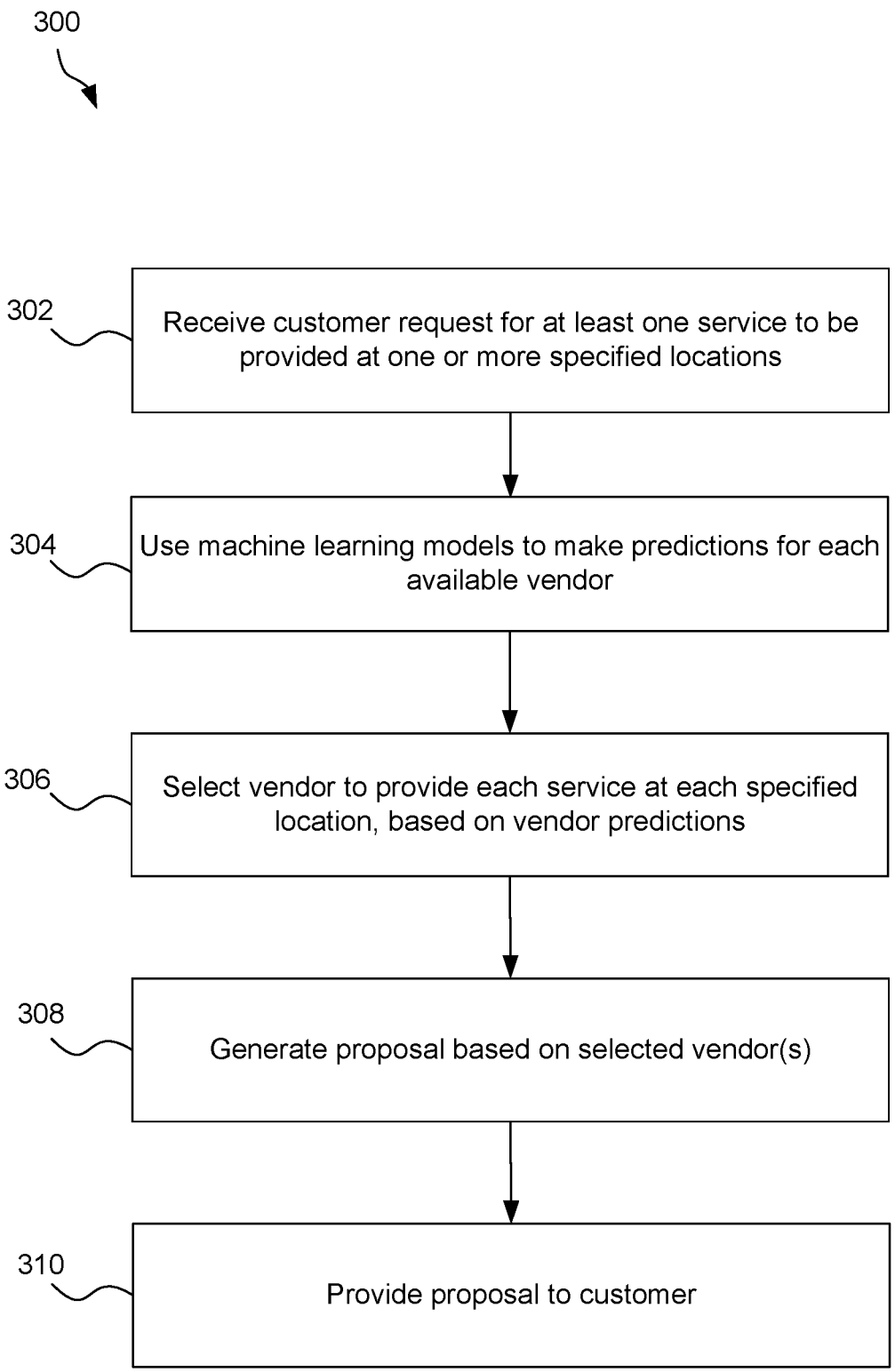
FIG. 3 illustrates a method for making a proposal to a customer, in accordance with one embodiment.

FIG. 3 illustrates a method 300 for making a proposal to a customer, in accordance with one embodiment. As an option, the method 300 may be carried out in the context of the details of the previous figure and/or any subsequent figure(s). Of course, however, the method 300 may be carried out in the context of any desired environment. For example, the method 300 may utilize the machine learning models 202 A-D of FIG. 2. Further, the aforementioned definitions may equally apply to the description below.

In operation 302, a customer request for at least one service to be provided at one or more specified locations is received. The customer request may be a request for a vendor proposal to provision the service(s) at the specified location(s). Thus, the request may indicate each service that is to be provided at each location. In one embodiment, the request may be to provision a single service at a single specified location. In another embodiment, the request may also be to provision additional services each at a corresponding specified location.

In operation 304, a plurality of machine learning models (e.g. models 202A-D of FIG. 2) are used to make predictions for vendors available to provide the service(s) at the specified location(s), in accordance with the customer request. In other words, the machine learning models output, per vendor/service/location combination, predictions associated with provisioning the service. The predictions may be made, for example, as described with respect to method 100 of FIG. 1 and/or input/output flow of FIG. 2.

In operation 306, a vendor is selected to provide each service at each specified location, based on the predictions made in operation 304. Specifically, for each service/location combination, a vendor is selected to provide the service at the specified location. In addition to the time of delivery predictions, the vendor may also be selected based on additional criteria, as desired. In this way, different vendors may be selected for different service/location combinations.

In operation 308, a proposal is generated based on the selected vendor(s). The proposal may indicate the vendor selected to provide each service at each specified location, in accordance with the customer request. Thus, when the customer request is for multiple services and/or multiple locations, the proposal, which is generated responsive to the customer request, may indicate different vendors to be used for provisioning two or more of the services for the different service/location combinations. As a result a vendor generating the proposal may itself be selected to provision one or more of the services for the different service/location combinations, and additional vendors may also be selected to provision services for other ones of the different service/location combinations.

In operation 310, the proposal is provided to the customer. The customer may then select to accept the proposal, in which case the vendors are instructed to provision the services in accordance with the proposal. As another option, the customer may use the proposal as basis for negotiations. In any case, by automatically selecting which vendor is to provision which service at which location, the method 300 may allow the vendor generating the proposal to increase profitability, save cost, and/or improve customer satisfaction and retention.

Figure 4:
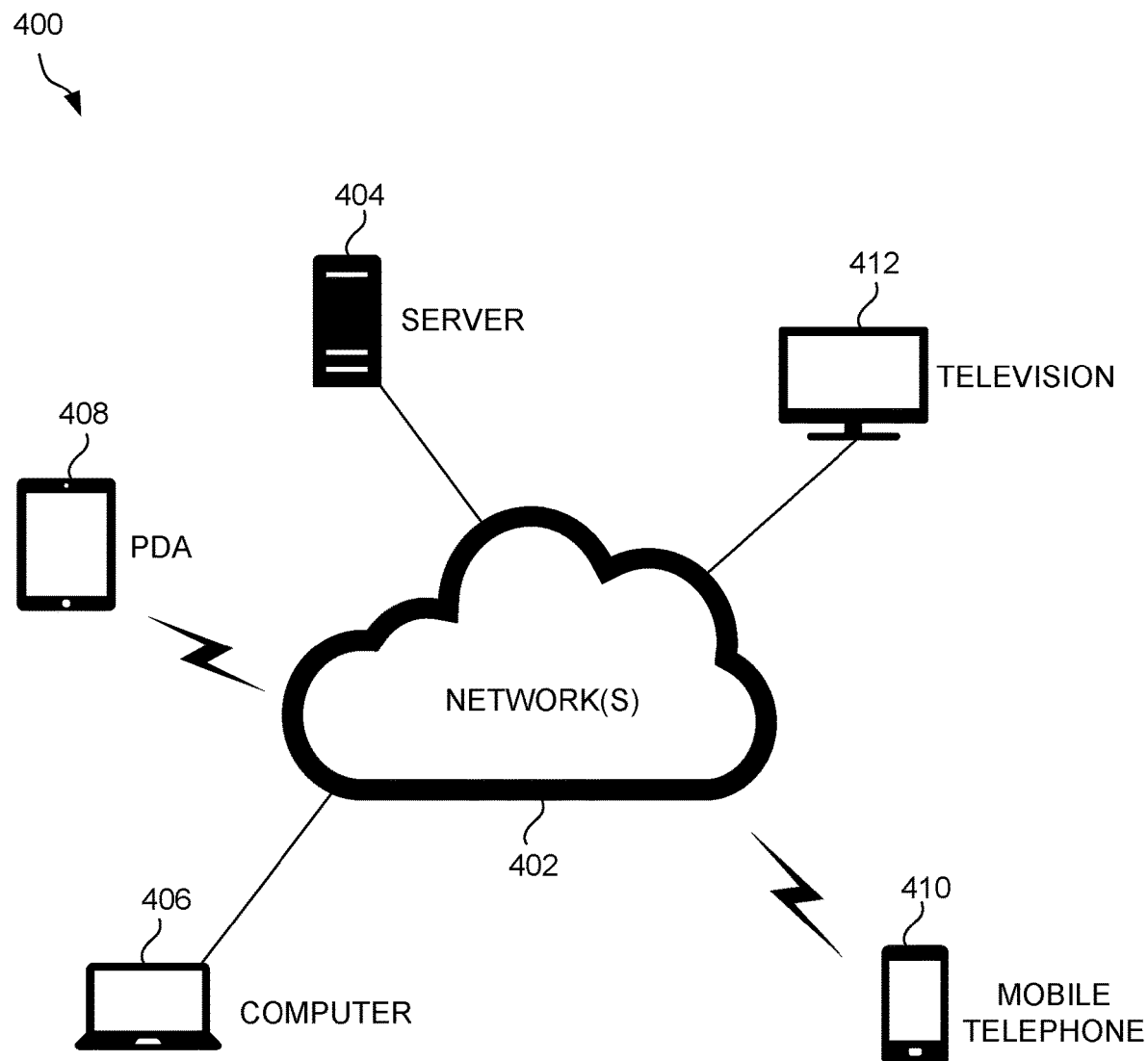
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
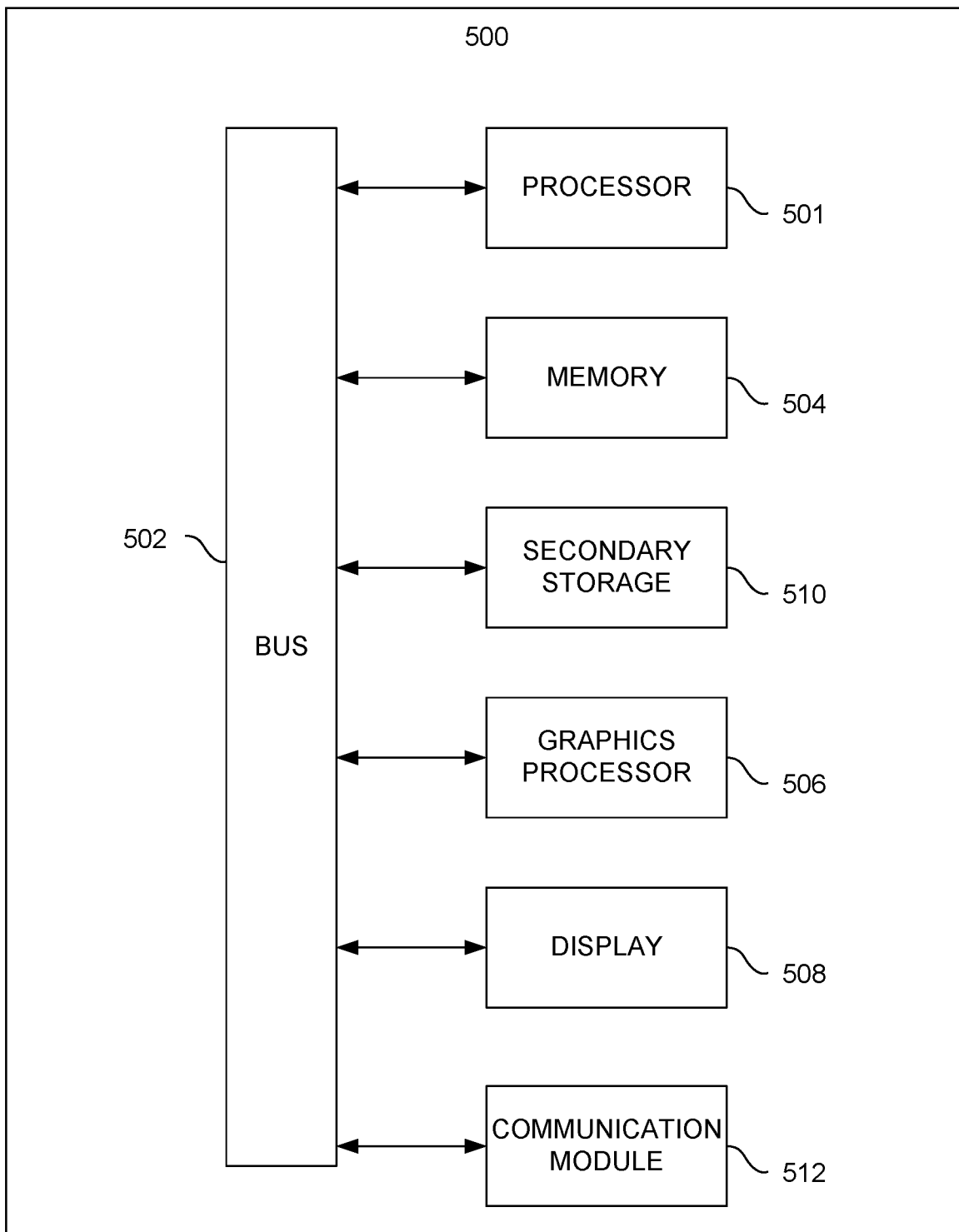
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   identifying a service to be provided at a specified location;
   identifying that a plurality of vendors are available to provide the service at the specified location;
   for each vendor of the plurality of vendors, using a plurality of machine learning models to make a plurality of predictions for the vendor with respect to the vendor providing the service at the specified location including:
   (a) processing an indication of the service, characteristics of the specified location, and an indication of the vendor, by a first machine learning model, to predict a time period required for the vendor to provision the service at the specified location,
   (b) processing the indication of the service, the characteristics of the specified location, and the indication of the vendor, by a second machine learning model, to predict whether the vendor will experience a delay in provisioning the service at the specified location within the time period,
   (c) processing the indication of the service, the characteristics of the specified location, and the indication of the vendor, by a third machine learning model, to predict a likelihood of a customer to issue a complaint responsive to the provisioning of the service by the vendor at the specified location, and
   (d) processing the indication of the service, the characteristics of the specified location, and the indication of the vendor, by a third machine learning model, to predict a probability of the customer continuing with the service once provisioned at the specified location by the vendor;
   for each vendor of the plurality of vendors, computing a score each of the predictions from (a)-(d);
   for each vendor of the plurality of vendors, generating an aggregate score from the scores computed for the predictions from (a)-(d);
   selecting a vendor of the plurality of vendors having an optimal combination of predictions from (a)-(d) for provisioning the service at the specified location, wherein the optimal combination is determined using the aggregate score generated for each vendor of the plurality of vendors.

2. The non-transitory computer readable medium of claim 1, wherein the service is a telecommunications service.

3. The non-transitory computer readable medium of claim 1, wherein the specified location is a site of a customer requesting the service.

4. The non-transitory computer readable medium of claim 1, wherein each machine learning model of the plurality of machine learning models is generated using a corresponding supervised machine learning process.

5. The non-transitory computer readable medium of claim 1, wherein the vendor is further selected based on a cost of an offer of the vendor to provision the service at the specified location.

6. The non-transitory computer readable medium of claim 1, further comprising:
   generating a proposal to provide the service at the specified location, based on the selected vendor.

7. The non-transitory computer readable medium of claim 6, further comprising:
provewing the proposal to the customer associated with the specified location.

8. The non-transitory computer readable medium of claim 6, wherein the proposal is generated responsive to a request from the customer to provide the service at the specified location.

9. The non-transitory computer readable medium of claim 8, wherein the request is further to provide a plurality of additional services each at a corresponding specified location.

10. The non-transitory computer readable medium of claim 9, wherein the method is repeated for each additional service of the plurality of additional services.

11. The non-transitory computer readable medium of claim 10, wherein the proposal further indicates the vendor selected to provide each additional service of the plurality of additional services.

12. The non-transitory computer readable medium of claim 10, wherein different vendors are selected for two or more additional services of the plurality of additional services.

13. The non-transitory computer readable medium of claim 6, further comprising:
receiving an order from the customer for the provisioning of the service at the specified location, based on the proposal.

14. The non-transitory computer readable medium of claim 1, wherein the method is performed by one of the vendors of the plurality of vendors.

15. A method, comprising:
identifying a service to be provided at a specified location;
identifying that a plurality of vendors are available to provide the service at the specified location;
for each vendor of the plurality of vendors, using a plurality of machine learning models to make a plurality of predictions for the vendor with respect to the vendor providing the service at the specified location including:
(a) processing an indication of the service, characteristics of the specified location, and an indication of the vendor, by a first machine learning model, to predict a time period required for the vendor to provision the service at the specified location,
(b) processing the indication of the service, the characteristics of the specified location, and the indication of the vendor, by a second machine learning model, to predict whether the vendor will experience a delay in provisioning the service at the specified location within the time period,
(c) processing the indication of the service, the characteristics of the specified location, and the indication of the vendor, by a third machine learning model, to predict a likelihood of a customer to issue a complaint responsive to the provisioning of the service by the vendor at the specified location, and
(d) processing the indication of the service, the characteristics of the specified location, and the indication of the vendor, by a third machine learning model, to predict a probability of the customer continuing with the service once provisioned at the specified location by the vendor;
for each vendor of the plurality of vendors, computing a score each of the predictions from (a)-(d);

for each vendor of the plurality of vendors, generating an aggregate score from the scores computed for the predictions from (a)-(d);
selecting a vendor of the plurality of vendors having an optimal combination of predictions from (a)-(d) for provisioning the service at the specified location, wherein the optimal combination is determined using the aggregate score generated for each vendor of the plurality of vendors.

16. A system, comprising:

a non-transitory memory storing instructions; and one or more processors in communication with the non-transitory memory that execute the instructions to perform a method comprising:

identifying a service to be provided at a specified location;

identifying that a plurality of vendors are available to provide the service at the specified location;

for each vendor of the plurality of vendors, using a plurality of machine learning models to make a plurality of predictions for the vendor with respect to the vendor providing the service at the specified location including:

(a) processing an indication of the service, characteristics of the specified location, and an indication of the vendor, by a first machine learning model, to predict a time period required for the vendor to provision the service at the specified location, (b) processing the indication of the service, the characteristics of the specified location, and the indication of the vendor, by a second machine learning model, to predict whether the vendor will experience a delay in provisioning the service at the specified location within the time period, (c) processing the indication of the service, the characteristics of the specified location, and the indication of the vendor, by a third machine learning model, to predict a likelihood of a customer to issue a complaint responsive to the provisioning of the service by the vendor at the specified location, and (d) processing the indication of the service, the characteristics of the specified location, and the indication of the vendor, by a third machine learning model, to predict a probability of the customer continuing with the service once provisioned at the specified location by the vendor;

for each vendor of the plurality of vendors, computing a score each of the predictions from (a)-(d);

for each vendor of the plurality of vendors, generating an aggregate score from the scores computed for the predictions from (a)-(d);

selecting a vendor of the plurality of vendors having an optimal combination of predictions from (a)-(d) for provisioning the service at the specified location, wherein the optimal combination is determined using the aggregate score generated for each vendor of the plurality of vendors.

17. The non-transitory computer readable medium of claim 1, wherein the aggregate score is an average of the scores computed for the predictions from (a)-(d).

* * * * *